June 14, 1927.

N. M. BAKER 1,632,266

OPHTHALMIC RIM STRETCHER

Filed Sept. 15, 1923

INVENTOR
NELSON M. BAKER.
BY
Harry H. Styll
ATTORNEY

Patented June 14, 1927.

1,632,266

UNITED STATES PATENT OFFICE.

NELSON M. BAKER, OF SOUTHBRIDGE, MASSACHUSETTS, ASSIGNOR TO AMERICAN OPTICAL COMPANY, OF SOUTHBRIDGE, MASSACHUSETTS, A VOLUNTARY ASSOCIATION OF MASSACHUSETTS.

OPHTHALMIC-RIM STRETCHER.

Application filed September 15, 1923. Serial No. 662,933.

This invention relates to improvements in rim stretching devices and has particular reference to devices for expanding ophthalmic lens receiving rims preparatory to the insertion of a lens therein.

My improved fixture is designed especially for use in expanding the continuous rims of eyeglass and spectacle frames, particularly that type of non-metallic frame now so much in vogue and formed of celluloid or other composition material simulating tortoise shell in appearance. Prior to my invention, rims of this type have been expanded in various ways, the most common being by the insertion of the jaws of a pair of pliers, which, by proper manipulation caused the rim to stretch. The difficulty with such pliers has been that they apply pressure to the rim at diametrically opposite points, forcing the rim into elliptical shape rather than enlarging it circularly. For this reason, prior art devices of this sort have not been entirely satisfactory except with a considerable waste of time and then have quite frequently caused damage to the frames.

One of the objects of my invention is the provision of an ophthalmic rim stretcher which will expand the whole rim uniformly and circularly.

Another object is to provide such a device which will be effective in operation and with a minimum expenditure of time.

A further object is to provide such a device with a gauge which will register the amount of expansion of the rim.

Still another object is to provide a rim stretcher with means for supporting one rim of the frame while the other is being operated upon.

Further objects and advantages will be apparent from the following description taken in connection with the accompanying drawings forming part of this specification.

Figure 1:
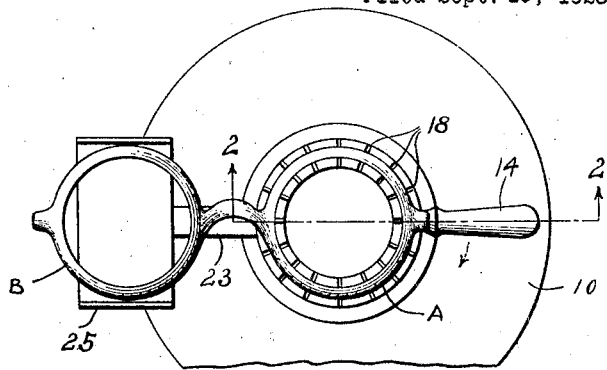

In the drawings, wherein similar reference characters are used to designate corresponding parts throughout the several views, Figure 1 is a top plan view of a rim stretcher embodying my invention.

Figure 2:
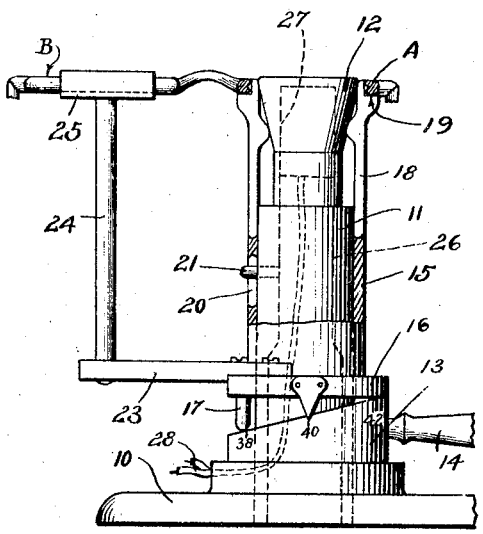

Figure 2 is a vertical, longitudinal, sectional view on the line 2—2 of Figure 1, the parts being in elevation.

In constructing my improved rim stretcher I provide a base member 10 with an upstanding cylindrical post 11 secured thereto, said post having at its upper end an outwardly flaring frustro-conical enlargement 12. Rotatably mounted upon the base 10 and surrounding the post 11 is a cam 13 which for convenience of operation is attached at one side to the hand grip 14.

The cylindrical sleeve 15 is mounted upon the post 11 above the cam 13 and has upon its lower edge the flange 16 which bears on one side of the cam 13 and the pin 17 which is secured to the flange and which also bears upon the cam 13. The upper end of the sleeve 15 is furcated preferably by means of the radial slots 18, any number of which may be used according to the size of the rims and the material of which the sleeve is made. The reason for slotting the upper end of the sleeve is to produce a sufficient degree of resiliency as will hereinafter be described.

The sleeve 15 has an enlarged diameter at its upper end upon which is formed a shoulder 19 which supports the rim A of an eyeglass frame as clearly illustrated in the drawings. Approximately midway of its length the sleeve is provided with a slot 20 in which is disposed the pin 21 which is secured to the post 11. The pin 21 prevents rotation of the sleeve 15 upon the post but allows it to move longitudinally thereon. Secured by any suitable means to the flange 16 is a transverse arm 23 which is provided at its end with an upstanding rod 24 carrying a tray 25 which is adapted to receive a second eye B of the frame. The post 11 is preferably provided with a central bore 26, in the upper end of which is mounted an electric heating element 27 which is connected to any suitable source of current supply by the conductors 28. It will, of course, be obvious that the electric heating element may be disposed of and the device heated by means of gas flame or hot plate.

In using the device I place the rim A which is to be expanded upon the upper end of the sleeve 15 resting upon the shoulder 19 and the other eye B of the frame resting upon the tray 25. By rotating the handle 14 in the direction of the arrow Figure 1, it will be evident that the pin 17 contacting with the upper side of the cam 13 will be raised to lift the whole sleeve 15 and forcing the interior surface of the sleeve contacting with the frusto conical enlargement of the base 11. Because of the fact that the sleeve 15 is slotted the action of the enlarged end 12 will enlarge the furcated end of the sleeve causing the rim A to expand. As this is done, the sleeve 15 is prevented from rotating by the pin 21 and it will be noticed that the rim B of the frame will always maintain its proper alignment in relation to the rim A because the tray 25 is moved integrally with the sleeve 15. Heat from the element 27 is conducted through the enlarged end 12 of the post to the upper end of the sleeve 15 which will be obvious to those skilled in the art.

My improved rim stretcher is of a simplified construction, will be strong and durable in service, highly efficient, and a great improvement in the art and it is to be understood that I do not limit myself to the precise construction illustrated and described herein and that I reserve the right to make changes in the form, proportions and arrangement of parts without departing from the spirit of my invention or the scope of the subjoined claims.

Having thus described my invention, what I claim is:

1. In a device of the character described, a base, a support thereon having a conical head, a split sleeve around the support having a seat for a lens rim in line with the conical head of the support, a cam engaging the sleeve whereby movement of the cam will slide the split sleeve on the support against the conical head thereof to expand the sleeve and the supported lens rim thereon.

2. In a device of the character described, a base, a support thereon having a conical head, a split sleeve over the support having a seat for a lens rim in line with the conical head of the support, a rotatable cam engaging the sleeve whereby rotation of the cam will slide the sleeve on the support against the conical head thereof to expand the sleeve and the lens rim thereon.

3. In a device of the character described, a base, a support thereon having a conical head, a split sleeve over the support having a rest for a lens rim in line with the conical head, a contact pin on the sleeve, and a cam engaging the contact pin, whereby movement of the cam will slide the contact pin and sleeve on the support against the conical head to expand the sleeve and the lens rim resting thereon.

4. In a device of the character described, a base, a support thereon having a conical head, a split sleeve over the support having a lens rim rest in line with the conical head, a contact pin on the sleeve, and a rotatable cam engaging the contact pin whereby rotation of the cam will slide the pin and sleeve on the support to engage the sleeve and conical head to expand the sleeve and the lens rim resting thereon.

5. In a device of the character described, a base, a support on the base having a conical head, a sleeve over the support having a rest for a lens rim in line with the conical head, a second support on the sleeve adapted to support the other rim of an ophthalmic mounting, and a cam engaging the sleeve whereby movement of the cam will slide the sleeve to engage the conical head and expand the sleeve and lens rim resting thereon.

6. In a device of the character described, a base, a support thereon having an enlarged head, an expandable sleeve over the support having a rest for a lens rim in line with the enlarged head, and a cam engaging the expandable sleeve whereby motion of the cam will slide the sleeve on the enlarged head to expand the sleeve and the lens rim resting thereon.

NELSON M. BAKER.